UNITED STATES PATENT OFFICE.

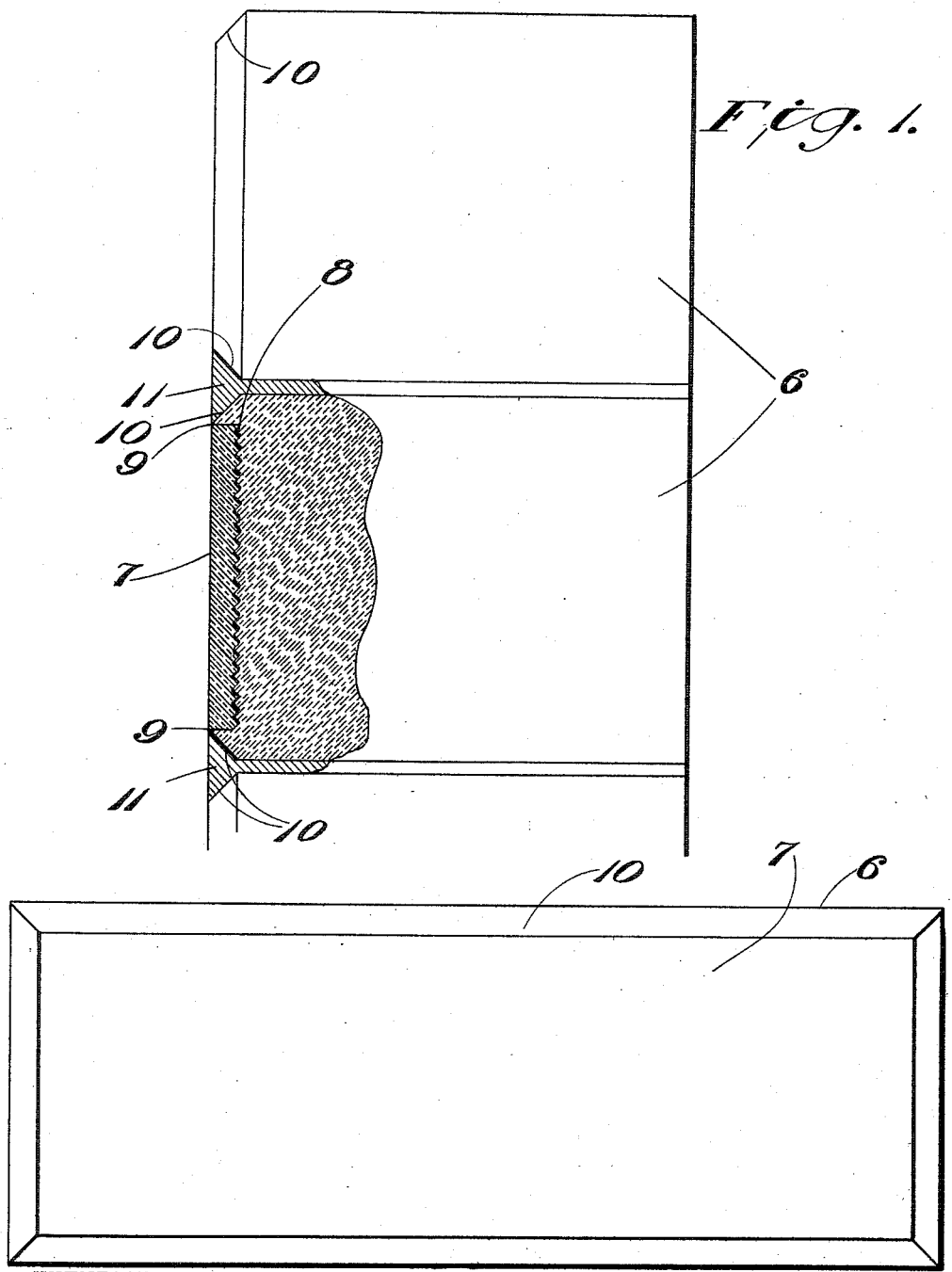

JOHN T. GROAT, OF DETROIT, MICHIGAN, ASSIGNOR OF ONE-HALF TO GEORGE WATTS, OF DETROIT, MICHIGAN.

GLASS-FACED BRICK.

1,018,747. Specification of Letters Patent. Patented Feb. 27, 1912.

Application filed November 8, 1911. Serial No. 659,134.

*To all whom it may concern:*

Be it known that I, JOHN T. GROAT, a citizen of the United States, residing at Detroit, in the county of Wayne and State of Michigan, have invented certain new and useful Improvements in Glass-Faced Brick, of which the following is a specification.

This invention relates to bricks for building, and particularly to concrete bricks faced with glass.

I am aware that bricks have heretofore been made or proposed having glass faces, either integral with the body of the brick, or attached thereto. Such of these bricks as are known to me are defective for various reasons, one being that in many of them the glass facing extends to the edge of the brick, and under weight the glass will chip or crack off; another is that the facing is made of molded glass, which is expensive and liable to crack.

My invention permits the use of sheet glass which can be cheaply produced and cut to the desired size to form the facing, the cement being applied to and molded around the same to hold the facing in place. Bricks having glass faces are desirable for use in tunnels and the like, and at other places where the bricks are exposed to moisture, the idea being to construct a water proof wall to prevent leakage or sweating.

In those constructions in which the glass facing does not lie in a single plane, but is made with ribs or offsets which are embedded in the body of the brick, there is great liability of fracture of the facing by expansion or contraction of the brick between the bent ends or edges of the facing. My invention avoids this, and is attended with other advantages as will appear from the following description.

Although as stated the glass facing of my brick does not extend to the edges of the brick, the construction is nevertheless such that when the bricks are laid in a wall the cement mortar between the bricks extends to the edge of the facing, so that no part of the concrete body is exposed, the mortar being formed with a head which laps the beveled edges of the brick, leaving only the glass exposed.

The invention is illustrated in the accompanying drawings in which—

Figure 1 is a side elevation partly in section, of a part of a wall constructed of bricks as described. Fig. 2 is a face view of one of the bricks.

Referring specifically to the drawings 6 indicates the body of the brick and 7 the glass facing slab. The body is preferably made of concrete, molded onto the slab, which latter, as shown, is of less size or area than the face of the brick which is to be exposed. The back of the glass slab is preferably corrugated as indicated at 8 to form a bond with the body, and the edges of the face of the brick extend around the edges of the glass facing, as shown at 9, the facing slab being thereby, sunken into the body of the brick at the front thereof. The rim 9 which extends around the glass facing is beveled as at 10 from the sides of the brick to the edge of the glass, and when the bricks are laid in a wall the cement mortar which is used will be laid flush with the glass face, overlapping the rims 9, as indicated at 11, whereby the glass facings, only, are exposed between the mortar beds.

Inasmuch as the glass facing does not extend to the edge of the brick the weight or pressure does not rest directly thereon, and cracking in consequence of said weight or pressure is avoided. The rims 9 act to protect the edges of the glass slab and also serve to hold the slab in place. The construction permits the brick to be molded at the back of sheet glass slabs, without the necessity for firing or other treatment to attach the slab to the body of the brick. Inasmuch as the glass slab is inclosed on all sides except the front, a secure bond is formed, and weight on the brick does not tend to cause the slab to break or fall off as with other bricks. The tendency of glass facings to crack and fall off has hitherto been a very great objection to bricks of this kind. My bricks may be constructed at much less cost than those in which the facing is molded onto the body, or fastened by metallic or other devices. It is also less liable to be injured in handling because of the protection afforded by the rim 9 to the edges of the glass slab.

What I claim as new is:

1. A brick comprising a body of molded material and a glass facing slab, said slab being slightly less in area than the area of the front of the brick, and the body having projecting rims at the front, engaging around the edges of the slab, said rims being beveled on the outer side to the front surface edges of the slab.

2. A wall comprising bricks having bodies of molded material and glass facing slabs embedded therein, the bricks having rims at the front extending around said slabs and beveled on the outer side to the edges of said slabs, and mortar between the bricks, lapping the bevels and filling the spaces between the slabs at the exposed surface of the wall.

In testimony whereof, I affix my signature in presence of two witnesses.

JOHN T. GROAT.

Witnesses:
ALHUS J. BEELAR,
BARBARA A. TASKER.

Copies of this patent may be obtained for five cents each, by addressing the "Commissioner of Patents, Washington, D. C."